April 2, 1968
C. A. HOLLINGSWORTH
3,376,124
FLUIDIZED BED ACIDULATION AND AGGLOMERATION
OF PHOSPHATE MATERIALS
Filed May 4, 1964
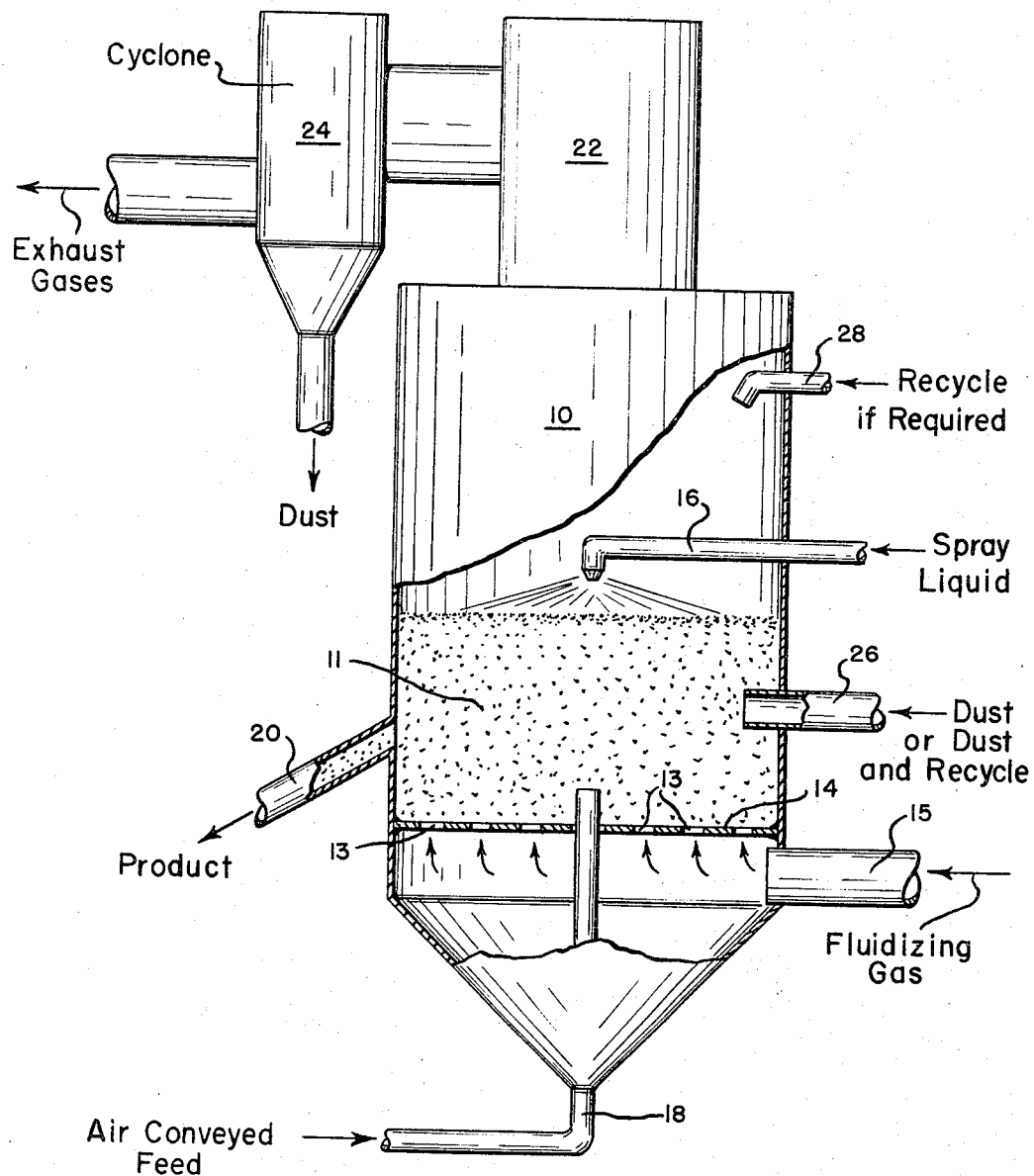
INVENTOR
Clinton A. Hollingsworth
BY
Pennie, Edmonds, Morton, Taylor & Adams
ATTORNEYS 
United States Patent Office 3,376,124
Patented Apr. 2, 1968

3,376,124
FLUIDIZED BED ACIDULATION AND AGGLOMERATION OF PHOSPHATE MATERIALS
Clinton A. Hollingsworth, Lakeland, Fla., assignor, by mesne assignments, to The Borden Company, a corporation of New Jersey
Filed May 4, 1964, Ser. No. 364,670
12 Claims. (Cl. 71—39)

ABSTRACT OF THE DISCLOSURE

Dry, granular acidulated phosphatic products, such as granular triple superphosphate, are produced by treating particulate phosphatic raw materials, such as ground phosphate rock, with a mineral acid, such as phosphoric acid, in a fluid bed reactor to effect, concurrently, acidulation of the phosphatic raw material and granulation and drying of the resultant acidulation reaction product.

---

The acidulation of phosphatic material with mineral acids—as, for example, the acidulation of phosphate rock with sulfuric acid to produce superphosphate—is an important, and frequently is the essential, feature of many commercial processes for producing phosphate fertilizers and animal food supplements. Conventional processes for acidulating phosphatic materials require two or more separate steps or operations to obtain a dry granular acidulated product. That is to say, in addition to the actual acidulation step, the acidulation reaction product must also be granulated and dried in order to obtain a satisfactory end product. Accordingly, conventional processes for the acidulation of phosphates ordinarily first employ a combined acidulation and granulation step wherein the phosphatic material is reacted with the mineral acid and the reaction product is granulated in a pug mill or similar apparatus and then a drying step wherein the granulated reaction product is dried in a suitable drier. These multi-step prior art processes require a substantial investment in process and material handling equipment which adds to the cost of producing a marketable product.

As a result of an extensive investigation undertaken to develop a more efficient and less costly process for producing acidulated phosphatic materials, I have discovered that when certain process conditions are observed a dry, granular acidulated phosphatic product can be obtained by treating the phosphatic material with a mineral acid in an operation utilizing essentially a single piece of process equipment. More specifically, I have devised a new process for acidulating phosphatic material which involves reacting the phosphatic material with acid in a fluidized bed to produce a dry, granular acidulated phosphatic product in a single operation. My new process comprises establishing a fluidized bed of particulate phosphatic material, introducing acidulating acid to the fluidized bed, preferably by spraying it onto the top of the bed, introducing the phosphatic material to be acidulated in particulate form into the lower portion of the fluidized bed, and withdrawing a dry granular acidulated phosphatic product containing less than 10% and preferably less than 5% moisture from the fluidized bed at a rate corresponding to the rate of addition of acidulating acid and phosphatic feed material to the bed so that steady state operating conditions are maintained. The fluidized bed is maintained at a temperature of at least about 125° F., and preferably at a temperature of between about 125° and 600° F., advantageously by control of the temperature of the fluidizing gas, the acidulating acid and the phosphatic feed material. The particle size of substantially all of the phosphatic feed material is preferably less than about 35 mesh (Tyler standard), and advantageously 50% of the feed material has a particle size of less than about 200 mesh, and the particle size of the dry granular product is preferably from about minus 6 to about plus 65 mesh (Tyler standard).

My process is applicable to the acidulation of raw phosphate rock, calcined defluorinated phosphates, and other phosphatic materials with any of the usual acidulating acids such as sulfuric acid, phosphoric acid, hydrochloric acid, nitric acid and mixtures of these acids to produce a wide variety of feed grade and fertilizer grade products such as normal superphosphate, triple superphosphate, nitro-phosphates, monocalcium and dicalcium phosphates and silicophosphates, and the like.

The acidulation reaction is carried out in a fluidized bed of particulate phosphatic material established in a conventional fluid bed reactor. The phosphatic feed material to be acidulated is introduced into the fluidized bed in particulate form either above, within or below the bed by any suitable means such as a screw conveyor or pneumatic system. The acidulating acid may be introduced either above, within or beneath the fluidized bed by means of a spray system. In some cases it may be advantageous to add small quantities of pulverized feed, recycled materials, or cyclone dust to the acid, the only limitation on the amount of solids that may be added to the acid prior to spraying it into the fluidized bed being the difficulty encountered in pumping and spraying the resulting slurry. As noted, mixtures of acids may be employed, and when an ammoniated phosphate product is to be produced, ammonia may be introduced at the bottom or lower portion of the bed so that acidulation and ammoniation are carried on at the same time. The normal turbulence of the fluidized bed assures that the acid and particulate solid matter of the bed will be brought into intimate contact with each other to effect the desired acidulation reaction, and acidulation, granulation, ammoniation (if desired) and drying are carried on simultaneously or concurrently in the fluidized bed.

The dry granular acidulated product is withdrawn from the fluid bed reactor at a rate corresponding to the addition of particulate phosphatic feed material and acidulating acid thereinto so that a stable fluidized bed is maintained in the reactor at all times. The product removed from the reactor is a dry granular or agglomerated material the particles of which are generally spherical in shape and of somewhat larger particle size than the particulate matter originally introduced into the reactor. The particle size of the product is determined largely by the particle size of the phosphatic feed material, the concentration and solids content of the acidulating acid, the retention time of the particles in the reactor, the temperature of the fluidized bed, and the amount of acidulated product recycled through the system. When a plant fertilizer is being produced the aforementioned factors are controlled so that the particle size of the product obtained is preferably within the range of about minus 6 mesh to plus 12 mesh (Tyler standard, and when an animal food supplement is being produced the particle size of the product is preferably within the range of about minus 14 to plus 65 mesh.

My invention will be better understood from the following description thereof in conjunction with the single figure of the accompanying drawing which shows, partly in section, a fluidized bed reactor adapted to carry out my new process.

The fluidized bed reactor 10 in which my new process is carried out is of essentially conventional design. A fluidized bed 11 of particulate phosphatic material is established in the reactor 10 by blowing a fluidizing gas upwardly through the particles in the manner well known in the art. The particulate material initially employed to establish the fluid bed 11 is advantageously the dry, granular acidulated product of earlier operations, the phosphatic raw material to be acidulated being added to the bed 11 after stable operating conditions have been established. The fluid bed 11 is maintained in the desired fluidized condition by the fluidizing gas introduced into the lower portion of the bed through the openings 13 formed in the perforated plate 14. The fluidizing gas is supplied by an external source (not shown) such as a centrifugal blower, the gas being introduced through the conduit 15 into the lower portion of the reactor 10 below the plate 14. Alternatively, the fluidizing gas may be the gaseous combustion product of a gas or fuel oil burner located either in an external combustion chamber or in the lower portion of the reaction vessel 10 itself.

The acidulating acid is introduced onto the upper portion of the fluidized bed preferably by means of a spray device 16 which distributes the acid uniformly over the upper surface of the bed. The normal turbulence of the fluidized bed 11 insures that the acid and particulate solid matter of the bed will be brought into intimate contact with each other to effect the desired acidulation reaction. The phosphatic feed material to be acidulated is introduced into the lower portion of the fluidized bed 11, preferably by blowing it thereinto through an air conveyor conduit 18, and the acidulated phosphatic product is withdrawn from the bed 11 through a suitable discharge conduit 20. The spent fluidizing gas and the gaseous reaction products of the acidulation reaction (principally water vapor) leave the fluid bed reactor 10 through the flue 22, and the exhaust gases are then preferably passed through a device such as cyclone 24 to remove entrained dust particles therefrom. The dust removed from the exhaust gases by means of the cyclone 24 is returned to the fluidized bed 11 either by mixing the dust with the acid prior to spraying the acid onto the fluid bed or by introducing the dust directly into the fluid bed itself below the surface thereof.

The product removed from the fluid bed 11 is a dry granular acidulated material the particles of which are generally spherical in shape and of somewhat larger size than the particulate matter originally introduced into the fluidized bed. As previously mentioned, when the granular product is to be used as a plant fertilizer, the particle size of the product is preferably within the range of about minus 6 mesh to plus 12 mesh (Tyler standard), and when an animal food supplement is being produced, the particle size is preferably within the range of about minus 14 to plus 65 mesh. The particle size of the product is determined largely by the particle size of the phosphatic feed material, the concentration and solids content of the acidulating acid, the retention time of the particles in the reactor, the temperature of the fluidized bed, and the amount of acidulated product recycled through the system. The granular product is screened to remove undersize and oversize particles, the oversize particles being crushed and mixed with the undersize material and then recycled to the fluidized bed. In a stabilized fluidized bed operation the amount of undersize and oversize product recycled is not great. However, in order to provide a sufficient quantity of particulate matter in the reactor 10 to permit the establishment of a stable fluid bed, and also to help control the temperature of the fluid bed, it is frequently desirable to recycle a substantial portion of the acidulated product through the system, and recycle feed conduits 26 and 28 are provided for this purpose.

The following examples are illustrative but not limitative of the practice of my invention.

Example I

A defluorinated phosphate rock product produced by the process of U.S. Patent 2,995,437 was acidulated in a fluidized bed of particulate phosphatic material established in a fluid bed reactor of the type shown in the drawing. The fine ground phosphatic feed material having a particle size such that 90% thereof was less than 65 mesh (Tyler standard) and containing about 18% by weight P was introduced into the lower portion of the fluidized bed at an average rate of 500 pounds of feed per hour. Defluorinated wet process phosphoric acid containing about 48.35% by weight $P_2O_5$ was sprayed onto the fluidized bed at an average rate of 234 pounds of acid per hour. The temperature of the fluidized bed was maintained at about 230° F. A dry, non-hygroscopic acidulated phosphatic product was withdrawn from the fluid bed reactor at a rate corresponding to the introduction of phosphatic feed material and acid thereinto, and the stable acidulation operation was continued for several hours. The product withdrawn from the fluidized bed averaged about 21% by weight P and contained 2.63% by weight of moisture, and 80% of the product had a particle size of greater than 35 mesh (Tyler standard). The solubility of the phosphorus content of the product in 0.4% hydrochloric acid, 2.0% citric acid and neutral ammonium citrate were as follows:

CHEMICAL ANALYSIS PERCENT P

Percent of total P soluble in:
HCl (0.4%) _____ 99.18
Citric (2%) _____ 95.98
NAC _____ 95.92
Moisture _____ 2.63
Total _____ 21.06

The screen analysis of the product is as follows:

SCREEN ANALYSIS, WEIGHT PERCENT

Tyler standard screen scale:
+6 _____ 5.0
−6+10 _____ 3.8
−10+14 _____ 7.0
−14+6 _____ 6.7
−16+35 _____ 57.5
−35+65 _____ 16.6
−65 _____ 3.4

Example II

Acidulated phosphatic products containing between 18 and 25% by weight P and not more than 5% residual moisture are produced by acidulating defluorinated phosphate rock with phosphoric acid containing 20 to 55% by weight $P_2O_5$ and up to 75% by weight of total solids ($P_2O_5$ with added solids) in accordance with the procedure described in Example I.

Example III

A triple superphosphate product was produced by acidulating phosphate rock with phosphoric acid in a fluidized bed of particulate phosphatic material established in a fluid bed reactor of the type shown in the drawing. The phosphate rock feed material was ground so that 90% thereof had a particle size of less than 100 mesh (Tyler standard). The fine ground phosphatic feed material containing about 32.90% by weight $P_2O_5$ was introduced into the fluidized bed by the use of an air slide, and wet process phosphoric acid containing 48.14% by weight $P_2O_5$ was sprayed on to the fluidized bed in the manner previously described. The proportion of phosphate rock to phosphoric acid added to the fluidized bed was such that 157 pounds of acid were introduced into the bed for every 100 pounds of rock feed thereinto. The temperature of the fluidized bed was maintained at about 210° F. A portion of the product as withdrawn from the fluidized bed was recycled to control the particle size and moisture content of the product, the ratio of recycled material to product recovered not exceeding 1:1. The product recovered was allowed to cure for one day and then was analyzed to determine its phosphate and calcium content, its citrate solubility, and the amount of free acid and moisture contained in the product. The product was again analyzed after it had been cured for 10 days with the following results:

| Description | Chemical Analysis, Percent | | | | | | |
|---|---|---|---|---|---|---|---|
| | $P_2O_5$ | | | CaO | Free Acid | Moisture Unground | Mole Ratio $CaO/P_2O_5$ |
| | Total | C.I. | APA | | | | |
| 1 day cure | 50.66 | 4.62 | 46.04 | 22.28 | 9.25 | 1.23 | 0.90 |
| 10 days cure | 50.61 | 3.67 | 46.94 | | 7.99 | 1.81 | |

Example IV

A normal superphosphate product was produced by acidulating phosphate rock with sulfuric acid in a fluidized bed of particulate phosphatic material in a fluid bed reactor of the type shown in the drawing. The phosphate rock was ground to obtain a feed material 95% of which had a particle size of less than 100 mesh. The fine ground phosphatic feed material containing about 33.4% $P_2O_5$ and the sulfuric acid, prediluted to a concentration of approximately 70% $H_2SO_4$, were introduced into the fluidized bed in the manner previously described. The fluidized bed was maintained at a temperature of about 200° F. The superphosphate product thus produced contained about 19.5% by weight $P_2O_5$ and about 7% by weight of moisture.

Example V

Normal, enriched and triple superphosphate products containing between 18 and 52% by weight $P_2O_5$ and not more than 8% residual moisture are produced by acidulating ground phosphate rack (95% of which is minus 100 mesh and 60% of which is minus 200 mesh) with sulfuric acid containing between 50 and 98% by weight $H_2SO_4$ and/or phosphoric acid containing 30 to 55% by weight $P_2O_5$ in accordance with the procedure described in Examples III and IV.

Example VI

Acidulated phosphate products containing at least 54% $P_2O_5$ and no significant quantity of residual moisture are produced by acidulating ground phosphate rock containing at least 72% by weight BPL with phosphoric acid containing between 52 and 72% by weight $P_2O_5$ at a temperature of about 600° F. in a fluid bed reactor in accordance with the procedure previously described.

Example VII

Ammoniated as well as acidulated phosphate products containing between 6 and 18% by weight N and between 21 and 27% by weight P are produced by introducing an ammoniating gas into a fluidized bed of phosphatic material and phosphoric acid in accordance with the procedure previously described.

Example VIII

Acidulated phosphate products containing up to 10% by weight potassium ($K_2O$) are produced by introducing a potassium compound (such as potassium chloride, sulfate, nitrate, phosphate, hydroxide or the like) into a fluidized bed of phosphatic material and phosphoric acid in accordance with the procedure previously described.

From the foregoing description of my new process for acidulating phosphatic materials in a fluid bed reactor, it will be seen that I have made an important contribution to the art to which my invention relates.

I claim:

1. Process for producing dry, agglomerated, acidulated phosphatic material consisting essentially of
    establishing and maintaining a fluidized bed of particulate phosphatic material composed essentially of particles of unacidulated and acidulated phosphate rock material by introducing a fluidizing gas at the bottom of the bed of said particulate material,
    introducing at least one acidulating acid selected from the group consisting of phosphoric acid, sulfuric acid, hydrochloric acid, nitric acid and mixtures of said acids into the fluidized bed of the particulate material,
    introducing particles of phosphate rock material to be acidulated into the fluidized bed, continuing to fluidize the particulate material until it agglomerates,
    maintaining the fluidized bed at a temperature of at least about 125° F., and
    removing a dry agglomerated acidulated phosphatic product containing less than 10% of residual moisture from the fluidized bed at a rate such that steady state conditions are maintained.

2. Process according to claim 1 in which the acidulating acid is introduced into the upper portion of the fluidized bed.

3. Process according to claim 1 in which phosphatic material to be acidulated is introduced into the lower portion of the fluidized bed.

4. Process according to claim 1 in which the particulate phosphate rock material is ground phosphate rock.

5. Process according to claim 1 in which the phosphate rock material is thermally defluorinated phosphate rock.

6. Process for producing dry, agglomerated, acidulated phosphatic material consisting essentially of
    establishing and maintaining a fluidized bed of particulate phosphatic material by introducing a fluidizing gas at the bottom of the bed of particulate material,
    introducing at least one acidulating acid into the fluidized bed of the particulate phosphatic material,
    introducing the phosphatic material to be acidulated in particulate form into the fluidized bed, substantially all of the phosphatic feed material having a particle size of less than about 35 mesh (Tyler standard), and at least about 50% of the feed material having a particle size of less than about 200 mesh, continuing to fluidize the particulate material until it agglomerates,
    maintaining the fluidized bed at a temperature within the range of about 125° to 600° F.,
    removing a dry agglomerated acidulated phosphatic product containing less than 10% moisture from the fluidized bed at a rate such that steady state conditions are maintained, substantially all of said granular products having a particle size within the range of about minus 6 mesh to plus 65 mesh (Tyler standard).

7. Process according to claim 6 in which the acidulating acid is introduced into the upper portion of the fluidized bed.

8. Process according to claim 6 in which phosphatic material to be acidulated is introduced into the lower portion of the fluidized bed.

9. Process according to claim 6 in which a potassium compound is introduced into the fluidized bed.

10. Process according to claim 6 in which the acidulating acid is selected from the group consisting of phosphoric acid, sulfuric acid, hydrochloric acid and nitric acid.

11. Process according to claim 6 in which not more than about 50% of the dry acidulated product removed from the fluidized bed is recycled through the system.

12. Process according to claim 6 in which the acidulating acid contains up to 75% solids.

(References on following page)

References Cited

UNITED STATES PATENTS 2,586,818  2/1952  Harms ---------- 23—259.2 X
2,600,253  6/1952  Lutz ---------------- 71—43

FOREIGN PATENTS 818,668  8/1959  Great Britain.

DONALL H. SYLVESTER, *Primary Examiner.*

D. T. KILEY, R. BAJEFSKY, *Assistant Examiners.*